United States Patent [19]

Williams et al.

[11] Patent Number: 5,377,094
[45] Date of Patent: Dec. 27, 1994

[54] PUSH-PULL OUTPUT STAGE FOR DRIVING MOTORS WHICH GENERATES AUXILIARY VOLTAGE SUPPLY

[75] Inventors: Richard K. Williams, Cupertino; Allen A. Chang, Milpitas; Barry J. Concklin, San Jose, all of Calif.

[73] Assignee: Siliconix Incorporated, Santa Clara, Calif.

[21] Appl. No.: 62,504

[22] Filed: May 14, 1993

[51] Int. Cl.[5] .............................. H02M 7/538
[52] U.S. Cl. .............................. 363/132; 363/98; 363/16; 318/434; 318/138; 327/110; 327/436
[58] Field of Search ............... 363/132, 133, 16, 17, 363/22, 23, 98, 53, 55, 56, 58, 24, 25; 318/434, 801, 802, 798, 138, 254, 439; 361/23; 307/570, 575, 577, 578, 584, 257, 285

[56] References Cited

U.S. PATENT DOCUMENTS

| | | | |
|---|---|---|---|
| 4,710,686 | 12/1987 | Guzik | 363/98 |
| 4,829,415 | 5/1989 | Haferl | 363/56 |
| 4,901,216 | 2/1990 | Small | 363/98 |
| 5,019,719 | 5/1991 | King | 307/577 |
| 5,119,000 | 6/1992 | Schultz | 318/254 |
| 5,157,592 | 10/1992 | Walters | 363/17 |
| 5,262,704 | 11/1993 | Farr | 318/434 |

Primary Examiner—William M. Shoop, Jr.
Assistant Examiner—John W. Cabeca
Attorney, Agent, or Firm—Skjerven, Morrill, MacPherson, Franklin & Friel

[57] ABSTRACT

A push-pull output stage for driving a motor which provides an auxiliary power supply Vaux above supply voltage Vcc by using highside MOSFETs which do not have source-body shorts, and by connecting a capacitor to the poles of the motor through rectifying diodes which output flyback pulses to the capacitor. Damage to the highside MOSFETs is prevented by limiting the voltage on the capacitor using a zener diode. The push-pull output stage increases the driving potential applied to the motor be eliminating the need for an isolating Schottky diode between the output stage and a power source. Back emf continues to supply energy to Vaux even after Vcc is removed.

16 Claims, 15 Drawing Sheets

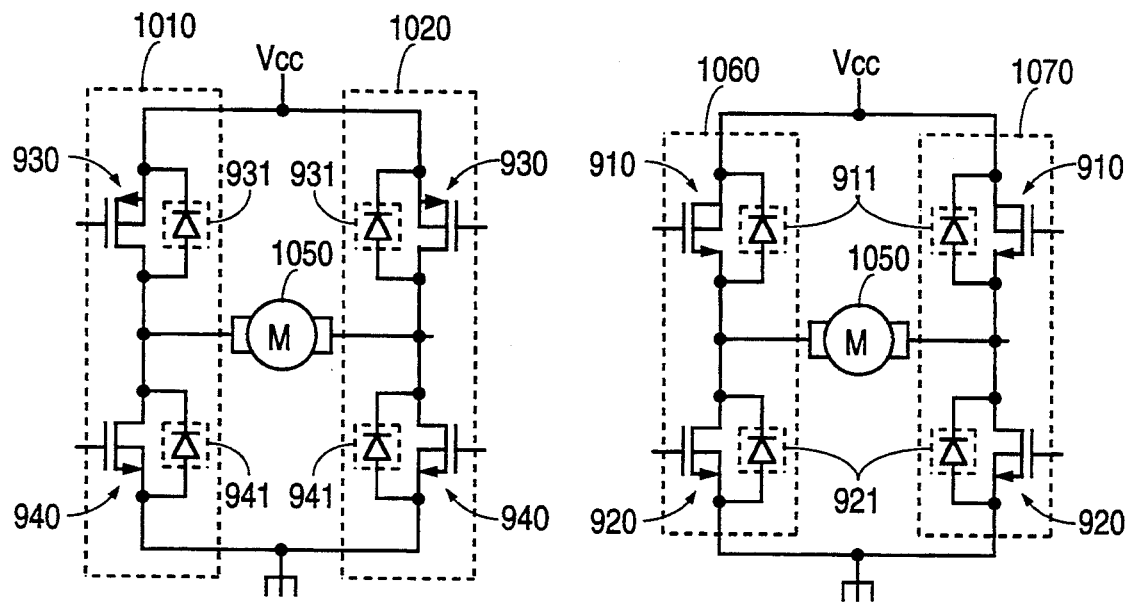
FIG. 10(a)
(PRIOR ART)
FIG. 10(b)
(PRIOR ART)
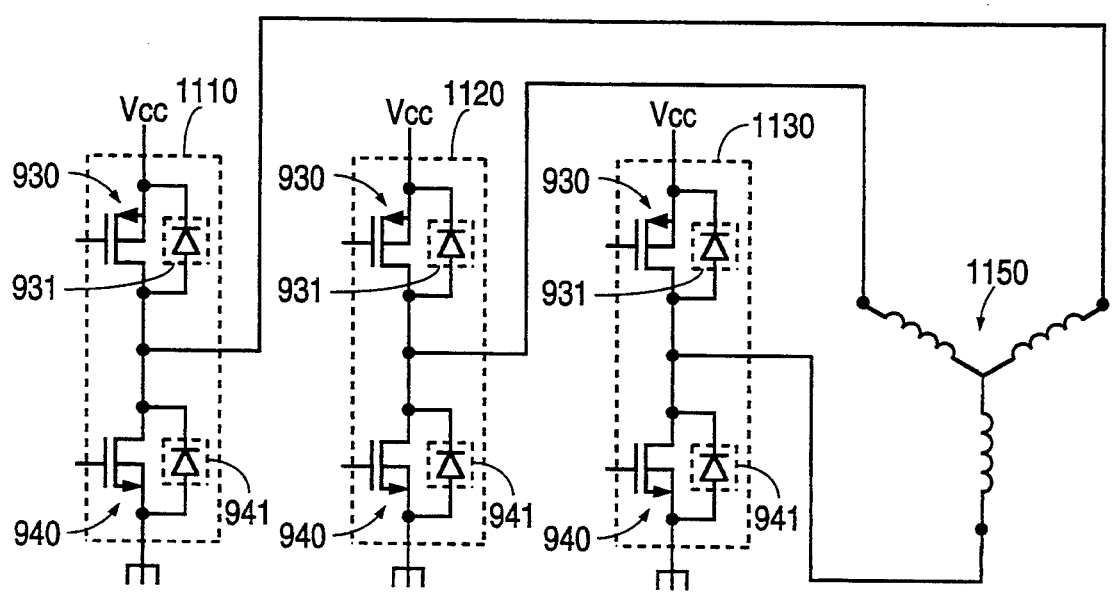
FIG. 11(a)
(PRIOR ART)

PUSH-PULL OUTPUT STAGE FOR DRIVING MOTORS WHICH GENERATES AUXILIARY VOLTAGE SUPPLY

This application is related to the following commonly owned and contemporaneously filed applications, all of which were filed on May 14, 1993 are incorporated herein by reference: application Ser. No. 08/062,968; application Ser. No. 08/062,503; and application Ser. No. 08/062,969.

BACKGROUND OF THE INVENTION

1. Field of the Invention

The present invention relates to an auxiliary power source in a battery-powered electronic device, and more particularly to an output stage which generates the auxiliary power from inductive flyback and back emf associated with motor operation.

2. Description of the Prior Art

The back electromotive force (emf) stored in a rotating motor is useful as an auxiliary power supply to power other circuitry in a motor controller, particularly when a collapse in the main supply does not short out the motor and shunt the back emf to ground. Properly protected from a supply short, an auxiliary voltage source powered by the motor may continue for several seconds after a power failure. This valuable time may be used to store information about a systems condition, to initiate some emergency response, to sustain circuitry until a UPS (uninterrupted power supply) can begin stable operation, or to initiate some predetermined shutdown procedure. In a hard disk drive, for example, the back emf from a spindle motor can be used to power a head retract before the disk stops spinning and a head crash results. For such circuitry, it is advantageous for the auxiliary supply to have a voltage even above the battery or input supply voltage.

Common power device technology teaches that parasitic bipolar conduction between a power MOSFET must be prevented by shorting the source and body regions of a MOSFET with a high concentration diffusion and metalized contact. This source-body short results in an intrinsic anti-parallel diode between the source and the drain.

FIGS. 9(a) through 9(d) show section views of push-pull MOSFET halfbridges illustrating the intrinsic anti-parallel diode created by the source-body short. The intrinsic anti-parallel diode is present in both integrated circuits, as shown in FIGS. 9(a) and 9(b), as well as discrete circuits, as shown in FIGS. 9(c) and 9(d).

FIG. 9(a) shows a section view of a totem pole NMOS halfbridge comprising a highside MOSFET 910 and a lowside MOSFET 920. The highside MOSFET 910 includes a p-type well W910 into which are formed an n-type source region S910 connected to an output terminal OUT and an n-type drain region D910 connected to a supply voltage Vcc. The highside MOSFET 910 also includes a high concentration p-type diffusion B910 connected to the source S910 by a metalized contact, thereby creating a source-body short. The source-body short in the highside MOSFET 910 creates a first intrinsic anti-parallel diode 911 between the source/body and the drain D910 of the highside MOSFET 910. The intrinsic anti-parallel diode 911 is back-biased during normal current flow through the highside MOSFET 910, and is forward-biased when the potential at the source/body S910 is greater than the potential at the drain D910. The lowside MOSFET 920 includes a p-type well W920 into which are formed an n-type source region S920 connected to ground and an n-type drain region D920 connected to the output terminal OUT. A body diffusion B920 of the lowside MOSFET 920 is connected to the source S920, thereby creating another source-body short, resulting in a second intrinsic anti-parallel diode 921. The intrinsic anti-parallel diode 921 is forward-biased when the potential on the output terminal OUT falls below ground, and is back-biased at all other times. Note that when the lowside MOSFET 920 is turned-on, current flows to ground regardless of the intrinsic anti-parallel diode 921.

FIG. 9(b) shows a CMOS halfbridge including a highside MOSFET 930 and a lowside MOSFET 940. The highside MOSFET 930 includes an n-type well W930 into which are formed a p-type source region S930 connected to Vcc and a p-type drain region D930 connected to the output terminal OUT. The highside MOSFET 930 also includes a high concentration n-type diffusion B930 connected to the source S930 by a metalized contact, thereby creating a source-body short. The source-body short in the highside MOSFET 930 creates a first intrinsic anti-parallel diode 931 between the source/body and the drain D930. The intrinsic anti-parallel diode 931 is back-biased during normal current flow through the highside MOSFET 930, and is forward-biased when the potential at the drain D930 is greater than the potential at the source S930. Note that when the highside MOSFET 940 is turned-on, current flows from Vcc to the output terminal OUT regardless of the intrinsic anti-parallel diode 931. The lowside MOSFET 940 includes an n-type source region S940 connected to ground and an n-type drain region D940 connected to the output terminal OUT. A p-type body diffusion B940 is connected to the source S940, thereby creating another source-body short, resulting in another intrinsic anti-parallel diode 941. The intrinsic anti-parallel diode 941 is forward-biased when the potential on the output terminal OUT falls below ground, and is back-biased at all other times.

FIGS. 9(c) and 9(d) show that the source-body short, and hence the intrinsic anti-parallel diodes, are an integral part of discrete DMOS designs. The DMOS halfbridge shown in FIG. 9(c) includes a highside MOSFET 950 and a lowside MOSFET 960. The highside MOSFET 950 includes intrinsic anti-parallel diodes 951 and 952 which are back-biased against normal current flow and are forward-biased when the potential on the output terminal OUT is greater than Vcc. In addition, the lowside MOSFET 960 includes intrinsic anti-parallel diodes 961 and 962 which are forward-biased when the potential on the output terminal OUT falls below ground, and are back-biased at all other times. Likewise, the highside MOSFET 970 of the DMOS halfbridge shown in FIG. 9(d) includes intrinsic anti-parallel diodes 971 and 972 which are back-biased against normal current flow and are forward-biased when the potential on the output terminal OUT is greater than Vcc. In addition, the lowside MOSFET 980 includes intrinsic anti-parallel diodes 981 and 982 which are forward-biased when the potential on the output terminal OUT falls below ground, and are back-biased at all other times.

FIGS. 10(a) and 11(a) show two-pole and three-pole driving circuits for driving two- and three-pole motors using the CMOS halfbridge shown in FIG. 9(b). Referring to FIG. 10(a), the two-pole driving circuit includes a first CMOS halfbridge 1010 connected to a first pole of a two-pole motor 1050, and a second CMOS halfbridge 1020 connected to a second pole of the motor 1050. Likewise, the three-pole driving circuit shown in FIG. 11(a) includes a first CMOS halfbridge 1110 connected to a first pole of a two-pole motor 1150, a second CMOS halfbridge 1120 connected to a second pole of the motor 1050, and a third CMOS halfbridge 1130 connected to a third pole of the motor 1050. In each of the CMOS driving circuits shown in FIGS. 10(a) and 11(a), the intrinsic anti-parallel diodes 931 of the highside MOSFETs 930 are back-biased against normal flow of current through the highside MOSFETs 930 and forward-biased when the voltage on the respective pole of the two-pole motor 1050 or the three-pole motor 1150 is higher than Vcc.

Similarly, FIGS. 10(b) and 11(b) show two-pole and three-pole driving circuits for driving two- and three-pole motors using the NMOS halfbridge shown in FIG. 9(a). Referring to FIG. 10(b), the two-pole driving circuit includes a first NMOS halfbridge 1060 connected to a first pole of a two-pole motor 1050, and a second NMOS halfbridge 1070 connected to a second pole of the motor 1050. Likewise, the three-pole driving circuit shown in FIG. 11(b) includes a first NMOS halfbridge 1160 connected to a first pole of a two-pole motor 1150, a second NMOS halfbridge 1170 connected to a second pole of the motor 1150, and a third NMOS halfbridge 1180 connected to a third pole of the motor 1150. In each of the NMOS driving circuits shown in FIGS. 10(b) and 11(b), the intrinsic anti-parallel diodes 911 are back-biased against normal flow of current through the highside MOSFETs 910 and forward-biased when the voltage on the respective pole of the two-pole motor 1050 or the three-pole motor 1150 is higher than Vcc.

FIGS. 12 through 14 illustrate how the intrinsic anti-parallel diodes of the highside MOSFETs in the above-described driving circuits provide an undesirable discharging conduction path from a motor to Vcc, regardless of the device polarity. FIG. 12 show a generalized two-pole driving circuit including highside MOSFETs 1210 and 1220 and lowside MOSFETs 1230 and 1240 which are connected to opposite poles VoutA and VoutB of a two-phase motor 1250. Note that the orientation of the intrinsic anti-parallel diodes 1211, 1221, 1231 and 1241 are the same as both the CMOS driving circuit of FIG. 10(a) and the NMOS driving circuit of FIG. 10(b).

FIGS. 13(a) and 13(b) show flyback pulses generated on VoutA and VoutB during normal operation of the driving circuit of FIG. 12. Each positive-going transition on VoutB generates a flyback pulse having a potential above Vcc which momentarily forward-biases the anti-parallel diode 1221. At the same time, negative-going transitions on VoutA generates a flyback pulse having a potential below ground thereby momentarily forward-biasing the anti-parallel diode 1231. Conversely, positive-going flyback pulses on VoutA momentarily forward-biases the anti-parallel diode 1211, and negative-going flyback pulses on VoutB momentarily forward-biases anti-parallel diode 1241. Each time the highside anti-parallel diodes 1211 and 1221 are forward-biased, the flyback energy is reabsorbed by Vcc.

FIGS. 14(a), 14(b) and 14(c) show how the back emf generated by the motor 1250 is lost to Vcc when the battery fails. At battery failure, the back emf of the motor 1250 (Vemf) is at a level determined by the driving potential Vcc. As Vcc drops to ground, the motor 1250 forward-biases anti-parallel diodes 1211 and 1221 each time a positive-going flyback pulse is applied to either VoutA or VoutB. However, the dead battery (and possibly other energy absorbing circuitry) create a load which discharges the back emf generated by the motor 1250 in about one second or less, which is not long enough to perform emergency power-down procedures.

FIG. 15 shows a prior art method to eliminate the loss of back emf to Vcc after a battery failure, thereby increasing the amount of time Vcc is available for emergency power-down procedures. FIG. 15 includes the generalized two-pole driving circuit of FIG. 12, and in addition includes a Schottky diode 1510 located between the battery (indicated by Vbattery) and the highside MOSFETs 1210 and 1220. The Schottky diode 1510 is forward-biased during normal operation, but when Vbattery fails, the Schottky diode 1510 is back-biased, thereby isolating the back emf generated by the motor 1510 on Vcc. Therefore, Vcc remains at a useful level for a longer period of time, as shown in FIG. 16, and can be used as an auxiliary power source to affect power-down procedures.

A problem with the above-described prior art output stage is that the isolating Schottky diode 1510 consumes significant amounts of power which could otherwise be used to drive the motor and, hence, generate back emf which can be used as an auxiliary power source. It is commonly understood that the voltage drop across a Schottky diode is approximately 0.5 to 1.5 volts. For a 5 volt power source, this represents a power loss of 10 to 30%. Further, because a spindle motor for a hard disk drive draws a current of several amps, approximately a watt of power can be lost due to the Schottky diode 1510, which could otherwise be used for emergency power-down procedures. In addition, in a 3 volt system, even a 0.5 volt diode drop represents a 17% voltage loss which makes the design of control circuitry nearly impossible, especially if a 2.7 volt battery condition is allowed.

SUMMARY

In accordance with the present invention, a push-pull output stage for driving a motor is provided which generates an auxiliary power supply by eliminating the isolating Schottky diode of the prior art and introducing a radical MOSFET structure which does not include a source-body short, thereby preventing the discharge of back emf to Vcc through the highside MOSFETs. Instead, flyback pulses are output from the poles of the motor to a reservoir capacitor through rectifying diodes, thereby generating an auxiliary power supply which is above Vcc.

An output stage in accordance with the present invention includes an n-channel highside MOSFET (first transistor) including a (first) drain region connected to a power supply, a body which is electrically isolated from the source, and a (first) source region. The body is connected to ground or to a predetermined potential which is lower than the power supply. A lowside n-channel MOSFET (second transistor) includes a (second) source connected to ground and a (second) drain, and is connected is series with the highside MOSFET such that the (first) source of the highside MOSFET is connected to the (second) drain of the lowside MOSFET. A first pole of the motor is connected to the source of the highside MOSFET and the drain of the lowside MOSFET, which combine with additional push-pull MOSFET pairs to produce an alternating potential for driving the motor. Finally, a charge storing device is connected to the source of the highside MOSFET and the drain of the lowside MOSFET for storing flyback energy, which is produced by the motor when the motor is running, and for providing an auxiliary power supply for performing emergency power-down procedures when power to the motor is removed.

Contrary to conventional wisdom regarding MOSFETs, in accordance with the present invention the first and second highside MOSFETs do not include source-body shorts, and therefore do not include the intrinsic anti-parallel diodes present in the prior art structure, described above. Instead, the source of each highside MOSFET is connected to the motor pole, and the body is connected to ground or to another predetermined potential. The benefit of this highside MOSFET structure is that the intrinsic diode between the source and the body of the highside MOSFET remains permanently reverse-biased, rather than across the drain to source connections. Therefore, flyback energy produced by the motor is not shunted to the power supply, but is used to charge a capacitor. This creates an auxiliary power supply which is independent of Vcc and, unless otherwise limited, will even exceed Vcc. In addition, the highside MOSFET structure of the present invention eliminates the need for the isolating Schottky diode used in the prior art output stage. Elimination of the isolating Schottky diode reduces power loss and increases the maximum voltage available for driving the motor, thereby increasing the available back emf used to charge the auxiliary power supply when Vcc fails. In addition, parasitic bipolars are avoided because the highside MOSFET junctions are reverse-biased, as opposed to the highside MOSFET of the prior art structure, which is forward-biased.

Also in accordance with the present invention, a method for recovering flyback energy from a motor is provided in which the motor is connected to a push-pull output stage including a highside n-channel MOSFET and a lowside MOSFET, the method including the steps of connecting a source of the highside MOSFET to a supply voltage and a base of the highside MOSFET to ground, and connecting a charge storing device to the source of the highside MOSFET and the drain of the lowside MOSFET through a rectifying diode whose anode is tied to the MOSFETs and whose cathode is tied to the charge storing device. By connecting a charge storing device to this rectified output of the push-pull driver, an auxiliary power supply having a potential above Vcc is generated which, can be used for performing emergency power-down procedures in the event of a primary battery failure, and may be used to power other circuits requiring a voltage higher than Vcc.

It may also be understood that replacing the highside n-channel MOSFET with a p-channel MOSFET whose source is tied to Vcc, whose drain is tied to the motor pole, and whose n-type body is not shorted to the source, can also be used to eliminate the anti-parallel diode. In such a case the body of the p-channel MOSFET can be connected directly to the charge storage device, thereby eliminating the need for the rectifying diode. As in the n-channel case, elimination of the source-body short results in only a reverse-biased junction between the motor pole and the PMOS body, except for when flyback pulses forward-bias the p-channel drain to body diode and energy is absorbed by the charge storage device of the auxiliary supply.

BRIEF DESCRIPTION OF THE DRAWINGS

These and other features, aspects, and advantages of the present invention will become better understood with regard to the following description, appended claims, and accompanying drawings, where:

FIGS. 10(a) and 10(b) show simplified circuit diagrams of two-pole prior art spindle motor drivers;

FIGS. 11(a) and 11(b) show simplified circuit diagrams of three-pole prior art spindle motor drivers;

DETAILED DESCRIPTION OF THE INVENTION

First Embodiment

Figure 1:
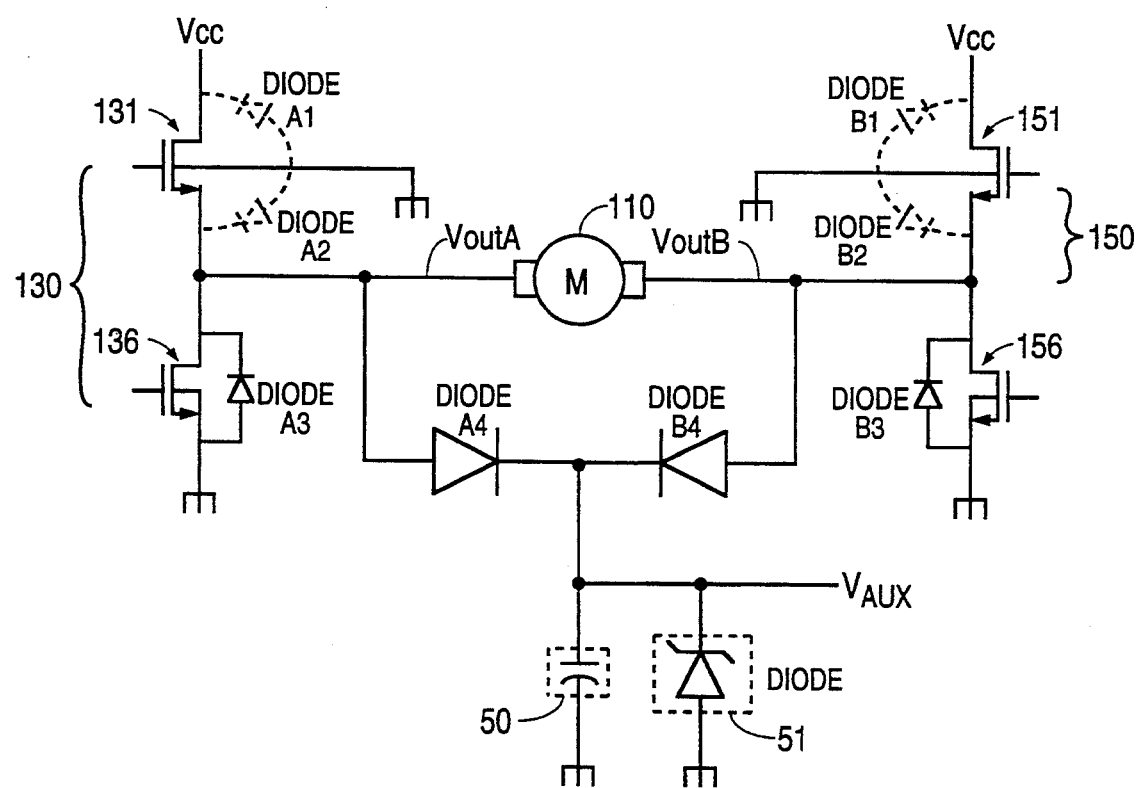
FIG. 1 shows a simplified circuit diagram of an apparatus incorporating a first embodiment of the present invention.
Figure 2:
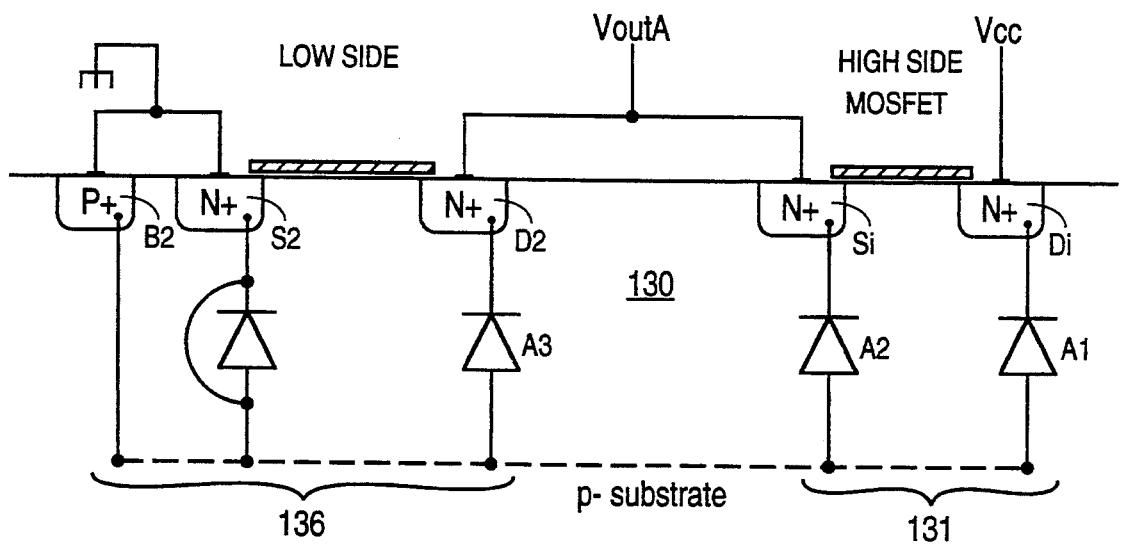
FIG. 2 shows a partial section view of a halfbridge of the apparatus according to the first embodiment.
Figure 3:
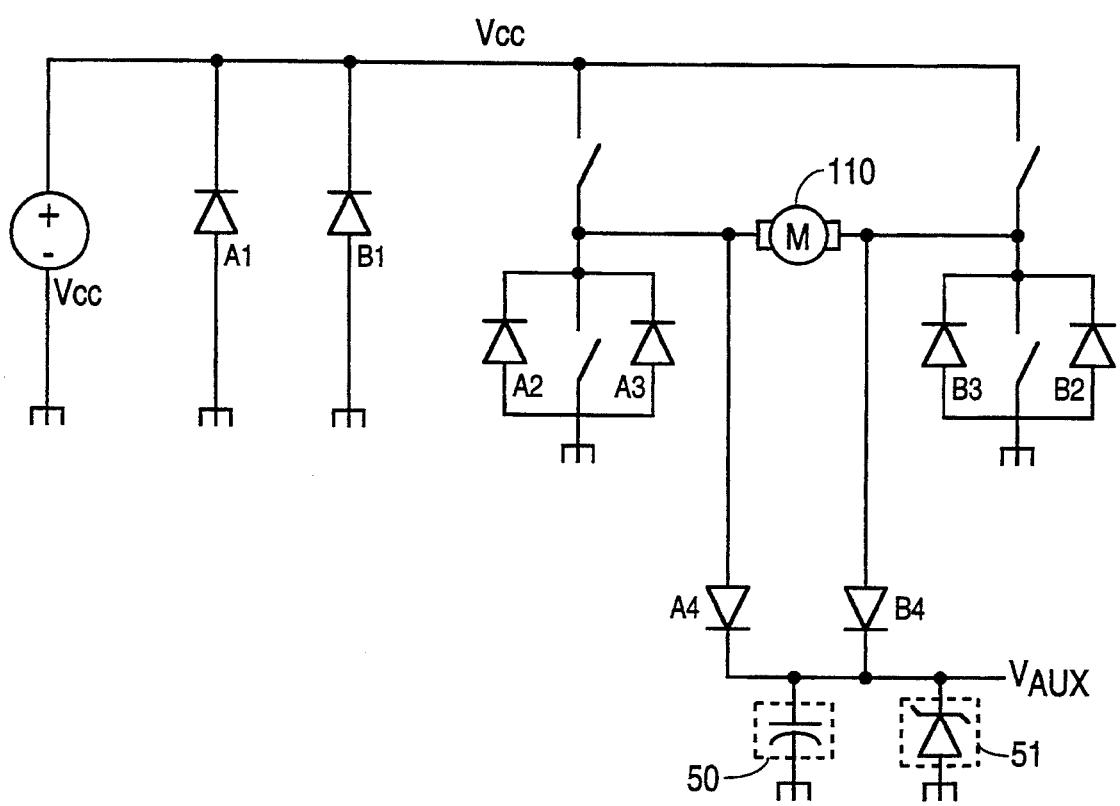
FIG. 3 shows an equivalent circuit of the apparatus according to the first embodiment.

FIGS. 1 through 3 show a push-pull output stage according to a first embodiment of the present invention.

As shown in FIG. 1, the output stage is connected to drive a two-phase motor 110. The output stage includes a first halfbridge 130, a second halfbridge 150, a pair of rectifying diodes A4 and B4, a capacitor 50 and a zener diode 51. The first halfbridge 130 includes a highside MOSFET 131 and a lowside MOSFET 136 connected to an output terminal VoutA, which in turn is connected to one pole of the motor 110. The second halfbridge 150 includes a highside MOSFET 151 and a lowside MOSFET 156 connected to an output terminal VoutB, which is connected to the second pole of the motor 110. The rectifying diode A4 has an anode connected to VoutA, and the rectifying diode B4 has an anode connected to VoutB. The cathodes of rectifying diodes A4 and B4 are connected together and to an auxiliary power line Vaux. The capacitor 50 has one terminal connected to Vaux and a second terminal connected to ground. The zener diode 51 has a cathode connected to Vaux and an anode connected to ground.

FIG. 2 shows a cross section of the first halfbridge 130 according to the first embodiment of the present invention. The halfbridge 130 includes a highside MOSFET 131 and lowside MOSFET 136. The highside MOSFET 131 includes an n-type source region S1 and an n-type drain region D1 formed in a p-type substrate. The drain D1 is connected to Vcc and the source S1 is connected to the output terminal VoutA. Note that the source S1 is not shorted to the substrate (body). Because of the absence of a source-body short, there is no diode connecting VoutA to Vcc (the anti-parallel diode of the prior art has been eliminated). The lowside MOSFET 136 includes an n-type drain region D2 and an n-type source region S2 formed in the p-type substrate. In addition, a P+ body region B2 is formed adjacent the source S2. The drain region D2 is connected to VoutA and the source region is shorted to the body region B2 and connected to ground. As indicated, the source-body short associated with the lowside MOSFET 136 creates an intrinsic anti-parallel diode A3 between the source/body and the drain D2 which is forward-biased when VoutA drops below ground, and is back-biased at all other times.

Referring back to FIG. 1, the second highside MOSFET 151 is identical to the first highside MOSFET 131, and the second lowside MOSFET 156 is identical to the first lowside MOSFET 156. Intrinsic diodes B1 and B2 of the second highside MOSFET 151 correspond to the intrinsic diodes A1 and A2 of the first highside MOSFET 131. Similarly, the intrinsic anti-parallel diode B3 of the second lowside MOSFET 156 corresponds to the intrinsic anti-parallel diode A3 of the first lowside MOSFET 136.

To prevent back emf on VoutA and VoutB from damaging the highside MOSFETs 131 and 151 during normal operation, rectifying diodes A4 and B4 are provided to output the flyback pulses from VoutA and VoutB to Vaux. That is, the diodes A4 and B4 are forward-biased each time VoutA and VoutB, respectively, are above Vaux. The capacitor 50 stores the flyback pulses transmitted through the rectifying diodes A4 an B4, thereby maintaining Vaux for emergency power-down procedures. When VoutA and VoutB cycle to a low potential, the rectifying diodes A4 and B4 are back-biased, thereby preventing discharge of Vaux onto VoutA and VoutB, respectively. In addition, the maximum voltage of Vaux is limited by the breakdown voltage of zener diode 51. It is preferred that the highside MOSFETs 131 and 151 are constructed such that the maximum breakdown voltage for intrinsic diodes A2, A3, B2 and B3 exceed the breakdown voltage of the zener diode 51 plus the forward-biased diode drop associated with the rectifying diodes A4 and B4. Note that the diode drop associated with rectifying diodes A4 and B4 does not cause an unacceptable series drop between Vcc and Vaux because the voltage at the outputs VoutA and VoutB are above Vcc during every other switching transition (as will be discussed below).

FIG. 3 shows an equivalent circuit representation of the output stage and auxiliary power supply according to the first embodiment of the present invention. The equivalent circuit reveals that only intrinsic diodes A1 and B1 are connected directly between ground and Vcc. FIG. 3 also shows that there are no diodes between the motor poles and Vcc.

Figure 4A:
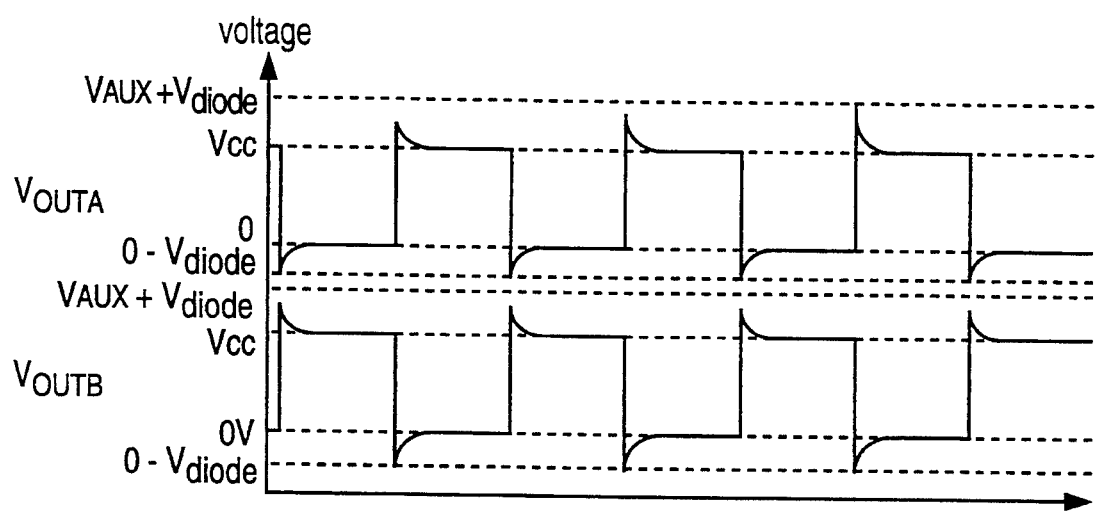
FIGS. 4(a), 4(b) and 4(c) show waveform diagrams.
Figure 4B:
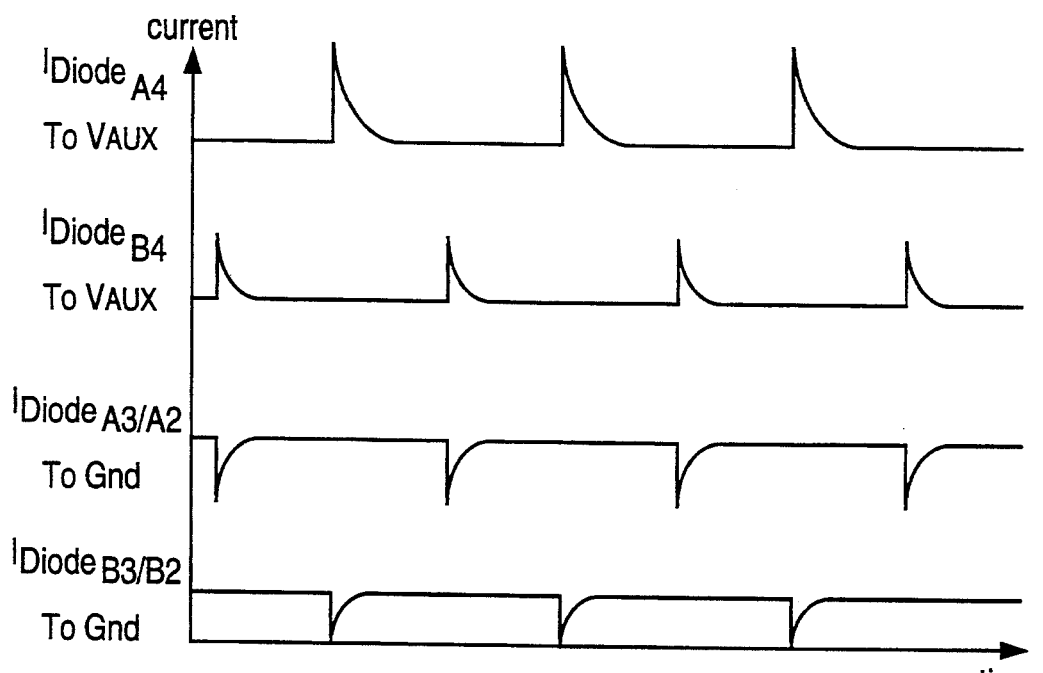
Figure 4C:
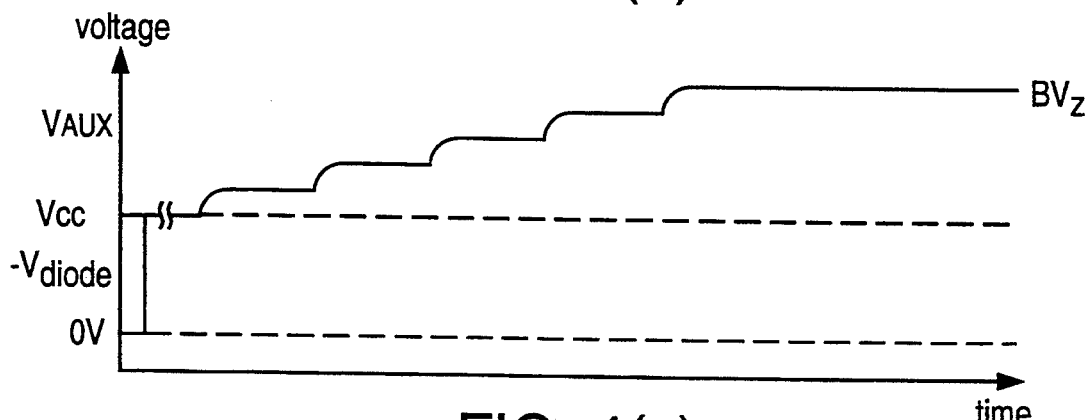

FIGS. 4(a), 4(b) and 4(c) show waveform diagrams indicating how Vaux is maintained above Vcc during normal operation of the output stage according to the first embodiment of the present invention. During normal operation, flyback pulses are generated on VoutA and VoutB during each positive-going and negative-going transition of the motor 110. As indicated, the flyback pulses have amplitudes above Vcc and below ground. This is possible because flyback emf is not limited to the driving potential Vcc, and is similarly not limited by the lowest driving potential. Positive-going flyback pulses are alternately conducted by diodes A4 and B4 to the capacitor 50 in a manner similar to a fullwave rectifier circuit. That is, when the positive-going flyback pulses exceed Vaux plus the diode drop associated with rectifying diodes A4 and B4, the rectifying diodes A4 and B4 are momentarily forward-biased. Similarly, intrinsic diode A2, in parallel with intrinsic diode A3, clamp negative-going flyback pulses to ground and otherwise remain reverse-biased, as do intrinsic diodes B2 and B3. The positive-going flyback pulses are accumulated on the capacitor 50 until Vaux equals the breakdown voltage BVz of the zener diode 51. After Vaux is equal to the breakdown voltage BVz, additional positive-going flyback pulses are shunted to ground through the zener diode 51.

It is noted that the diodes A4 and B4 (asymmetric elements) may be replaced by MOSFETs having sources and gates connected to VoutA and VoutB, respectively, and drains connected together and to the auxiliary power line Vaux.

With the above-described output stage according to the first embodiment of the present invention, an auxiliary power supply is generated from positive-going flyback pulses, thereby providing an auxiliary power supply which is above Vcc.

Further, the highside MOSFET structure of the output stage according to the first embodiment of the present invention generates a higher back emf than is possible using the disclosed prior art. As discussed in the background section, the disclosed prior art requires a Schottky diode between the battery and the halfbridges to prevent discharge of back emf to Vcc. The highest possible prior art motor driving potential is limited to Vbattery minus the diode drop associated with the Schottky diode. In accordance with the present invention, the highside MOSFET structure prevents discharge of back emf to Vcc due to the grounded body. Therefore, the Schottky diode is not necessary, and the driving potential applied to the poles of the motor 110 is Vbattery. Because the diode drop associated with the Schottky diode is 0.5 to 1.5 volts, the increased driving potential is significant, particularly when a power supply of 3 volts is used.

In addition, the highside MOSFET structure used in the first embodiment of the present invention teaches away from the conventional MOSFET practice of providing source-body shorts. The resulting junctions are, however, reverse-biased (not forward-biased) and therefore do not adversely affect the possibility of parasitic bipolar snapback in the highside MOSFETs. The only drawback is that the body effect due to the separated source and body raises the highside MOSFET threshold voltages. In the first embodiment, this concern is irrelevant because a charge pump must be included to drive the gate above the supply rail with or without the source-body short.

Second Embodiment

Figure 5:
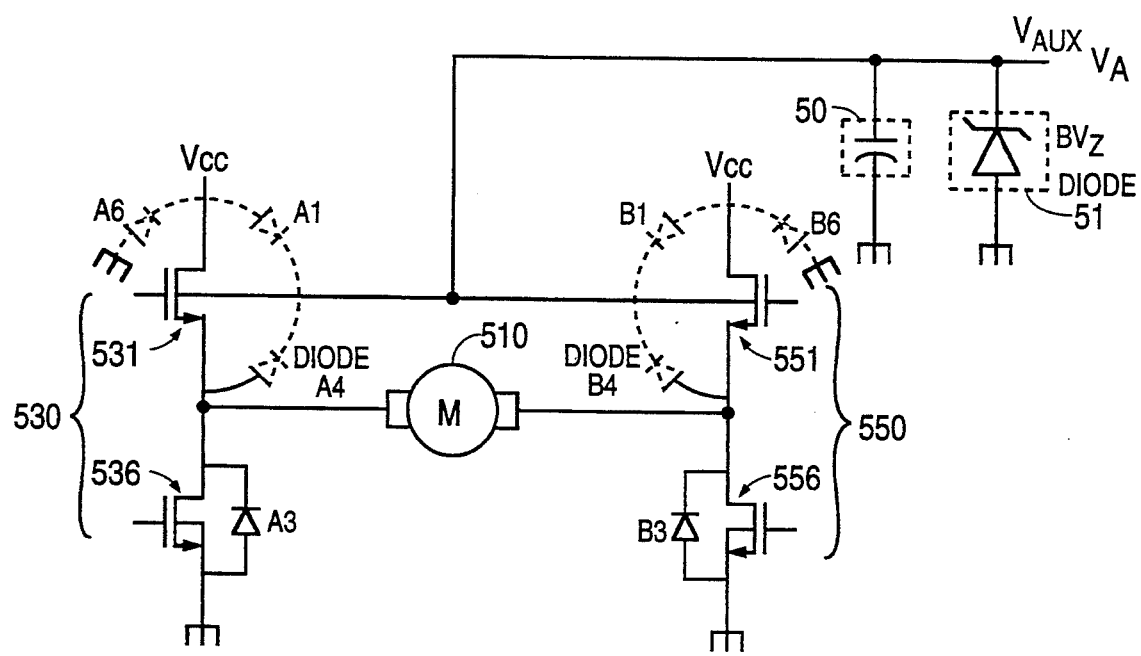
FIG. 5 shows a simplified circuit diagram of an apparatus incorporating a second embodiment of the present invention.
Figure 6:
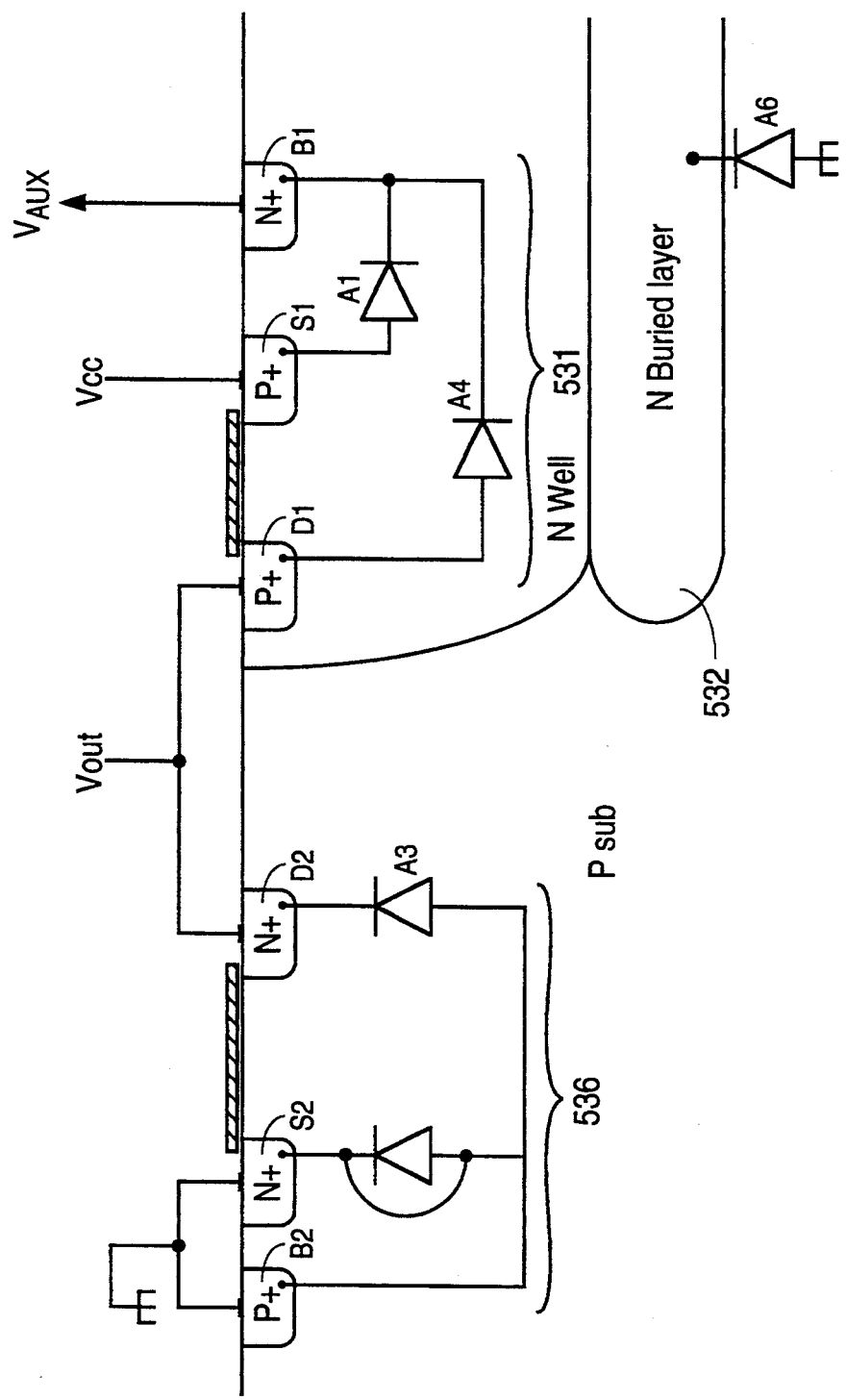
FIG. 6 shows a partial section view of a halfbridge of the apparatus according to the present invention.

FIGS. 5 and 6 show an output stage and auxiliary power source according to a second embodiment of the present invention. The second embodiment includes a push-pull output stage using CMOS technology.

As shown in FIG. 5, the output stage is connected to drive a two-phase motor 510. The output stage includes a first halfbridge 530, a second halfbridge 550, a capacitor 50 and a zener diode 51. The first halfbridge 130 includes a highside p-channel MOSFET 531 and a lowside n-channel MOSFET 536 connected to an output terminal VoutA, which in turn is connected to one pole of the motor 510. The second halfbridge 550 includes a highside MOSFET 551 and a lowside MOSFET 556 connected to an output terminal VoutB, which is connected to the second pole of the motor 510.

FIG. 6 shows a cross section of the first halfbridge 530 according to the second embodiment of the present invention. The halfbridge 530 includes a highside MOSFET 531 and lowside MOSFET 536. The highside MOSFET 531 includes a p-type source region S1 and a p-type drain region D1 formed in an n-type well W1. In addition, an N+ body region B1 is formed adjacent the source S1. The source S1 is connected to Vcc and the drain D1 is connected to the output terminal VoutA. As indicated, this arrangement produces intrinsic diode A1, which is formed between the source S1 and the body B1, and intrinsic diode A4, which is formed between the drain D1 and the body B1. Finally, an intrinsic diode A6 is formed between the buried layer 532 and ground.

The lowside MOSFET 536 includes a spaced-apart n-type source S2 and drain D2, and further includes a P+ body region B2. The source S2 and body B2 are connected together and to ground, thereby forming a source-body short. The drain D2 is connected to output terminal VoutA. As indicated, this arrangement produces intrinsic anti-parallel diode A3, which is connected between the drain D2 and the grounded body.

Referring back to FIG. 5, the second halfbridge 550 includes a second highside MOSFET 551 connected between Vcc and a second output terminal VoutB, and a second lowside MOSFET 556 connected between the second output terminal VoutB and ground. The second highside MOSFET 551 is identical to the first highside MOSFET 531, and the second lowside MOSFET 556 is identical to the first lowside MOSFET 536. Intrinsic diodes B1, B4 and B6 of the second highside MOSFET 551 correspond to the intrinsic diodes A1, A4 and A6 of the first highside MOSFET 531. Similarly, the intrinsic anti-parallel diode B3 of the second lowside MOSFET 556 corresponds to the intrinsic anti-parallel diode A3 of the first lowside MOSFET 536.

Operation of the output stage according to the second embodiment of the present invention is similar to the first embodiment (above). However, as shown in FIG. 5, the grounded capacitor 50 is connected to the body B1 of the first and second highside MOSFETs 531 and 551 without the intervention of a rectifying diode, as in the first embodiment (above). Flyback pulses are transmitted to Vaux via the intrinsic diodes A4 and B4, which function like rectifying diodes. The intrinsic diodes A1 and B1 along with N-Well diodes A6 and B6 remain reverse-biased. The intrinsic diodes A3 and B3 remain reverse-biased except during negatively-going flyback pulses, when they clamp the output to a diode drop below ground.

As in the first embodiment, the highside MOSFET structure used in the second embodiment of the present invention teaches away from the conventional MOSFET practice of providing source-body shorts. Similar to the first embodiment, the resulting junctions are reverse-biased (not forward-biased) and therefore do not adversely affect the possibility of parasitic bipolar snapback in the highside MOSFETs 531 and 551. The only drawback is that the body effect due to the separated source and body raises the highside MOSFET threshold voltages. However, in the second embodiment the body effect is minimized because Vaux is only a few volts over Vcc where the PMOS source connections are referenced.

Multi-phase Embodiments

Figure 7A:
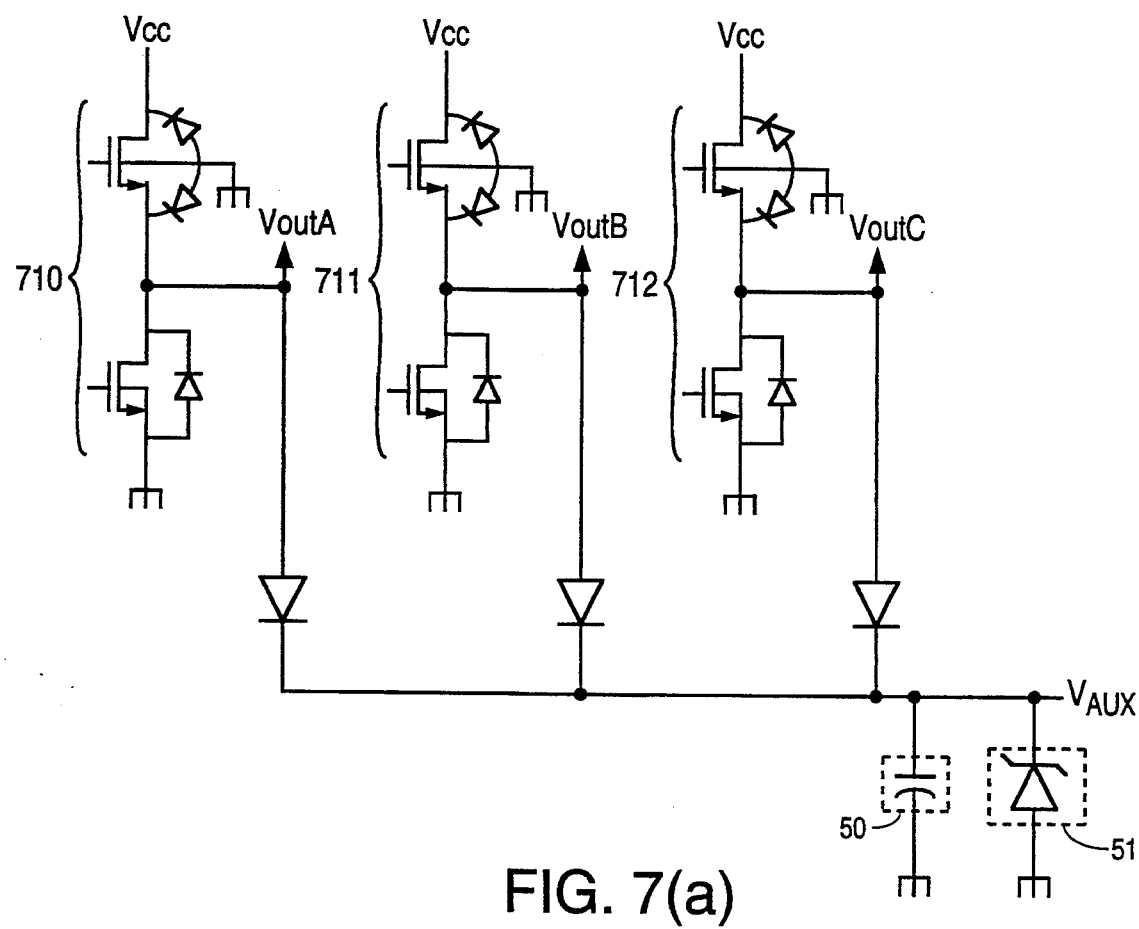
FIGS. 7(a) and 7(b) show simplified circuit diagrams of three-phase apparatus incorporating fourth and fifth embodiments of the present invention.
Figure 7B:
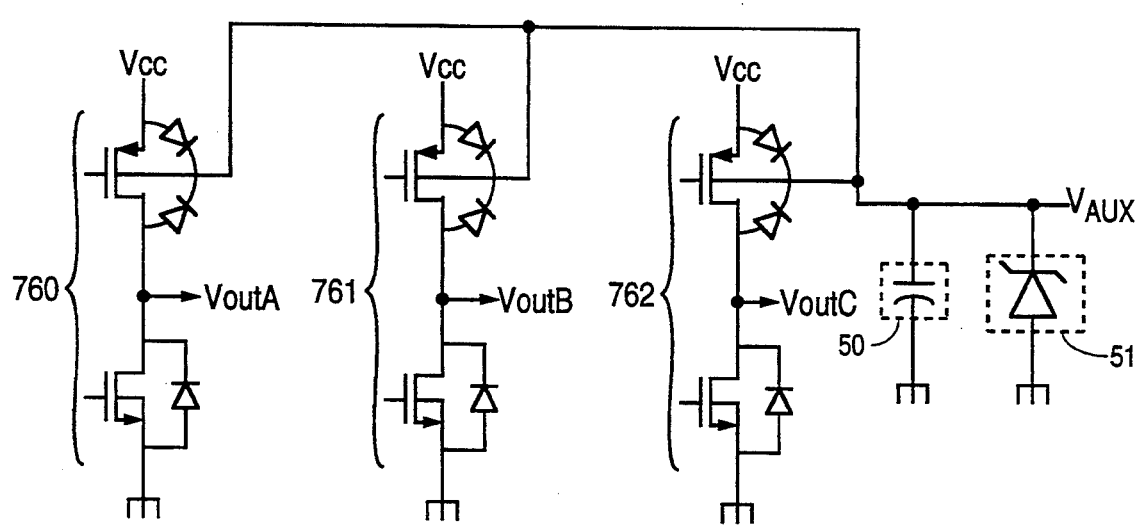

FIGS. 7(a) and 7(b) show three-phase output stages incorporating the teachings of the first and second embodiments. FIG. 7(a) shows a three-phase output stage incorporating the NMOS totem-pole structure which was incorporated into the two-phase output stage of the first embodiment. The three-phase bridge includes a first halfbridge 710 connected to a first pole of a three-phase motor (not shown) through output terminal VoutA, a second halfbridge 711 connected to a second pole of the three-phase motor through output terminal VoutB, and a third halfbridge 712 connected to a third pole of the three-phase motor through output terminal VoutC. As in the first embodiment, each of the halfbridges 710, 711 and 712 includes a highside MOSFET including an n-type source region connected to Vbat and an n-type drain region connected to one of the output terminals VoutA, VoutB or VoutC. Further, the body of each of the highside MOSFETs is connected to ground. Each of the halfbridges also includes a lowside NMOS FET with a drain connected to one of the output terminals VoutA, VoutB or VoutC and a source connected to ground. The highside MOSFET and lowside MOSFET associated with each halfbridge are connected to the same output terminal. In addition, each output terminal VoutA, VoutB and VoutC is connected to one pole of the three-phase motor and to a capacitor 50 through diodes A4, B4 and C4, respectively. Finally, a grounded zener diode 51 is connected in parallel with the capacitor 50.

FIG. 7(b) shows a three-phase output stage 750 incorporating the CMOS structure which was incorporated into the two-phase output stage of the second embodiment. The three-phase bridge 750 includes a first halfbridge 760 connected to a first pole of a three-phase motor (not shown) through output terminal VoutA, a second halfbridge 761 connected to a second pole of the three-phase motor through output terminal VoutB, and a third halfbridge 762 connected to a third pole of the three-phase motor through output terminal VoutC. As in the second embodiment, each of the halfbridges 760, 761 and 762 includes an n-channel highside MOSFET including an p-type source region connected to Vbat and an p-type drain region connected to one of the output terminals VoutA, VoutB or VoutC. Further, the body of each of the highside MOSFETs is connected to a grounded capacitor 50. Each of the halfbridges also includes a p-channel lowside MOSFET with an n-type drain connected to one of the output terminals VoutA, VoutB or VoutC and an n-type source connected to the grounded body. The highside MOSFET and lowside MOSFET associated with each halfbridge is connected to the same output terminal. Finally, grounded zener diode 51 is connected in parallel with the capacitor 50.

Figure 8A:
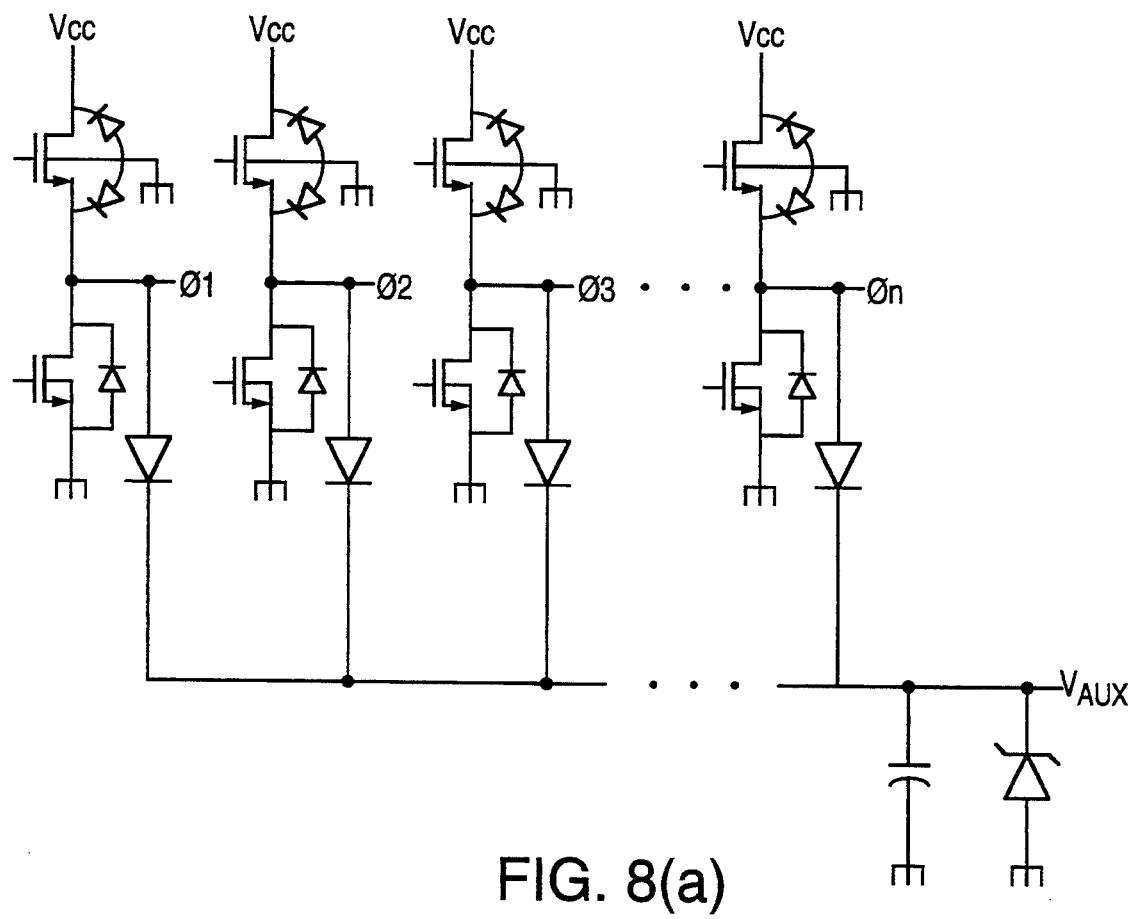
FIGS. 8(a) and 8(b) show simplified circuit diagrams of generalized N-phase apparatus incorporating fourth and fifth embodiments of the present invention.
Figure 8B:
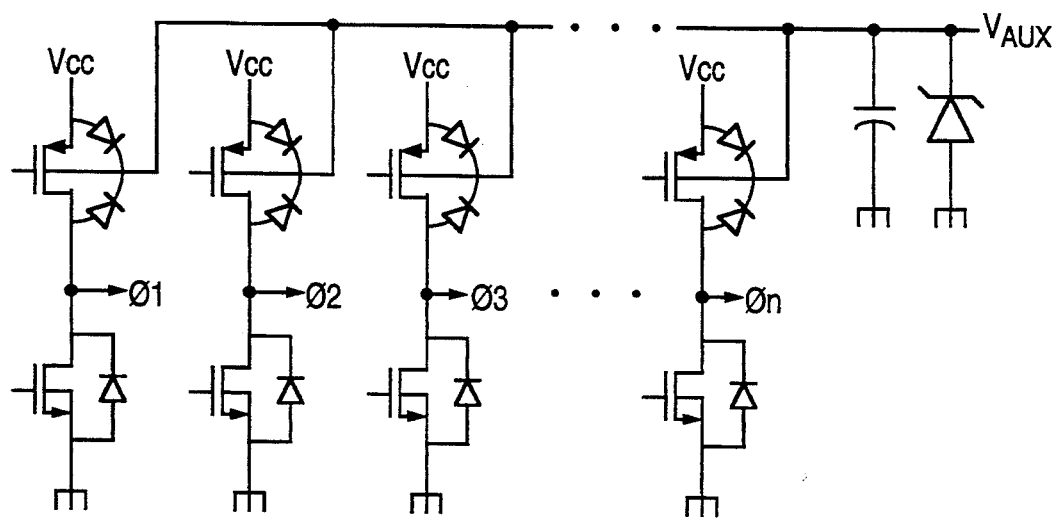
Figure 9A:
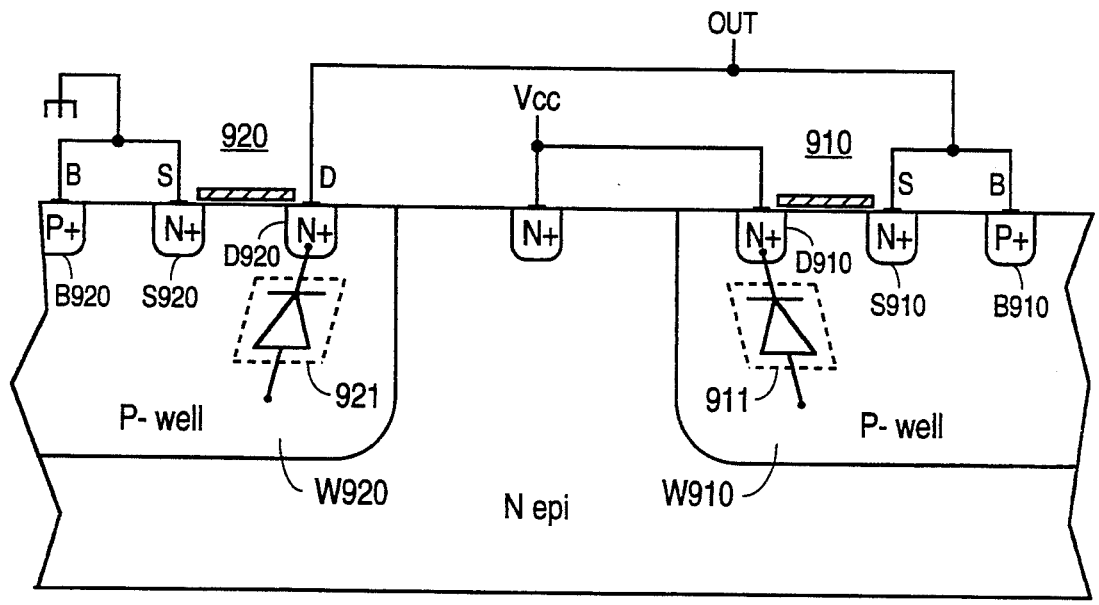
FIGS. 9(a), 9(b), 9(c) and 9(d) show section views of prior art push-pull halfbridges.
Figure 9B:
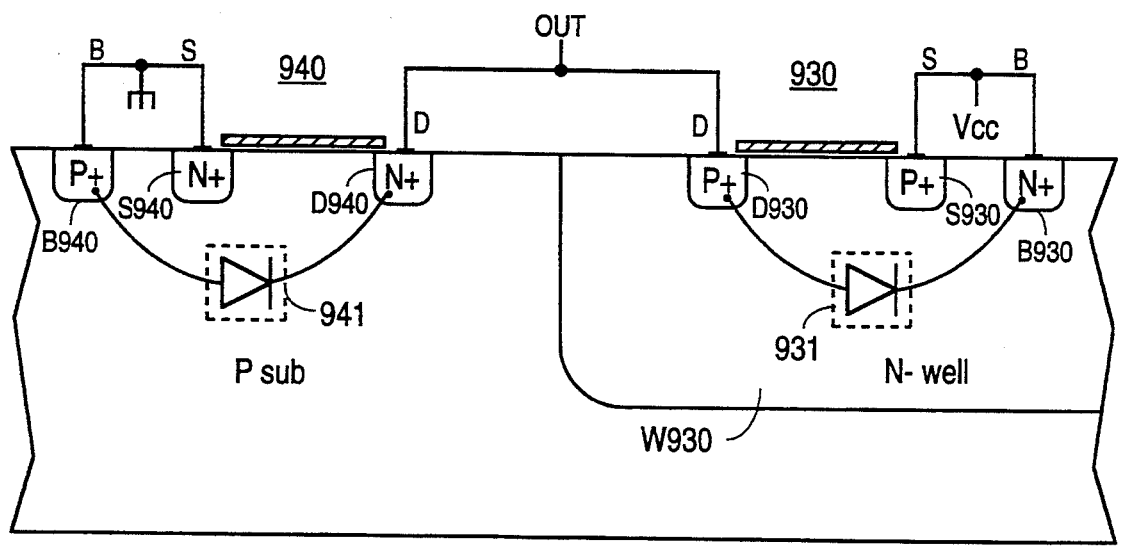
Figure 9C:
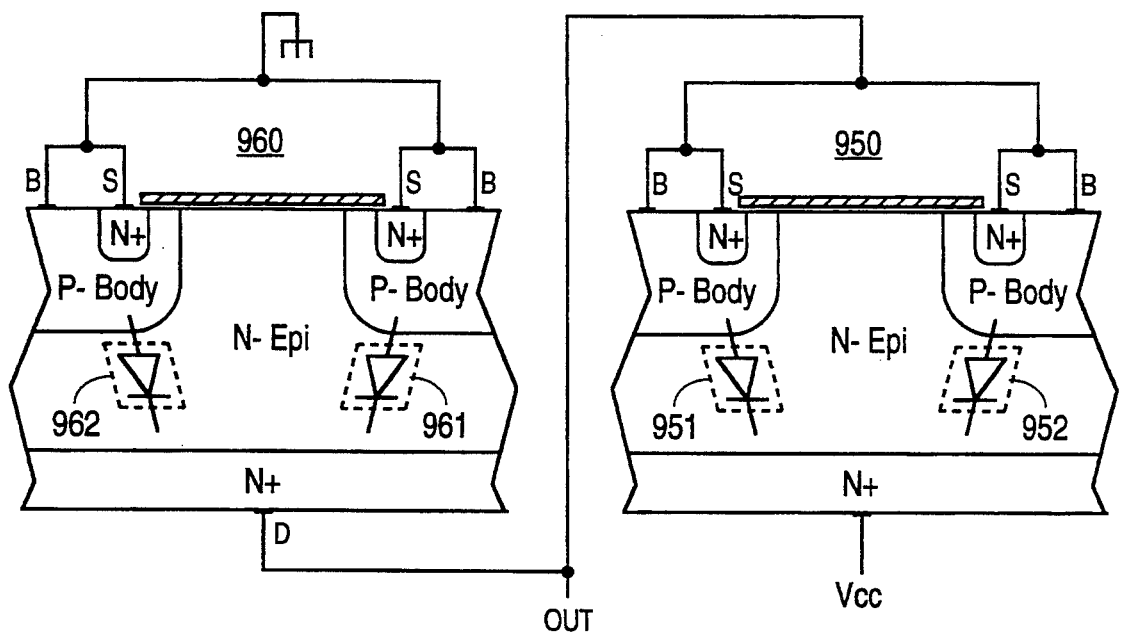
Figure 9D:
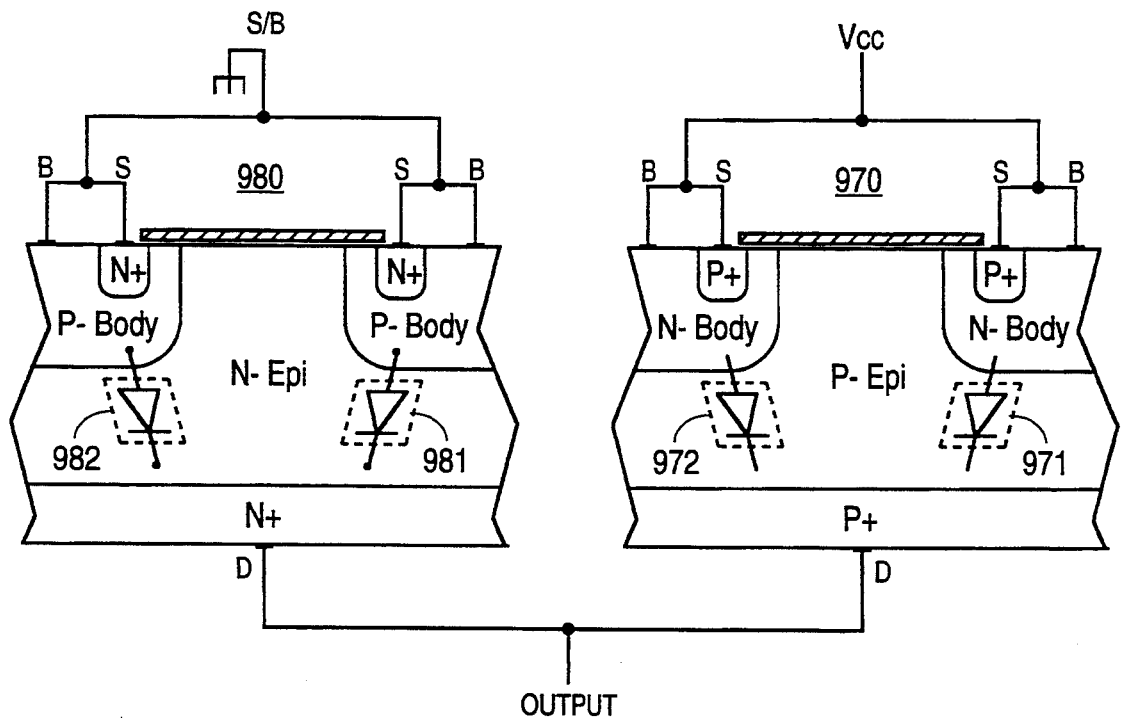
Figure 11B:
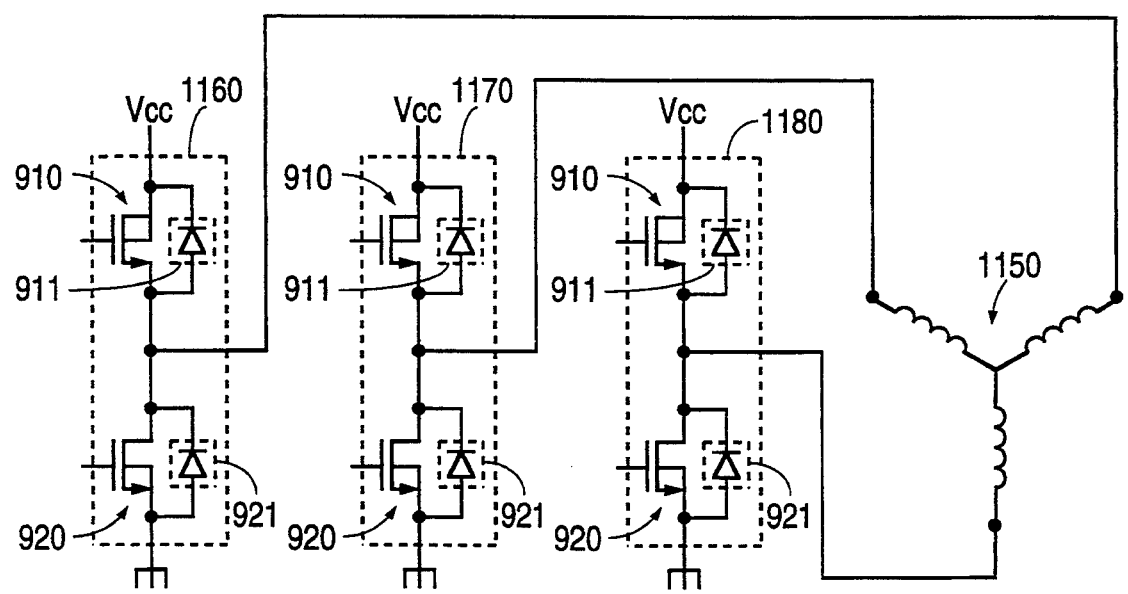
Figure 12:
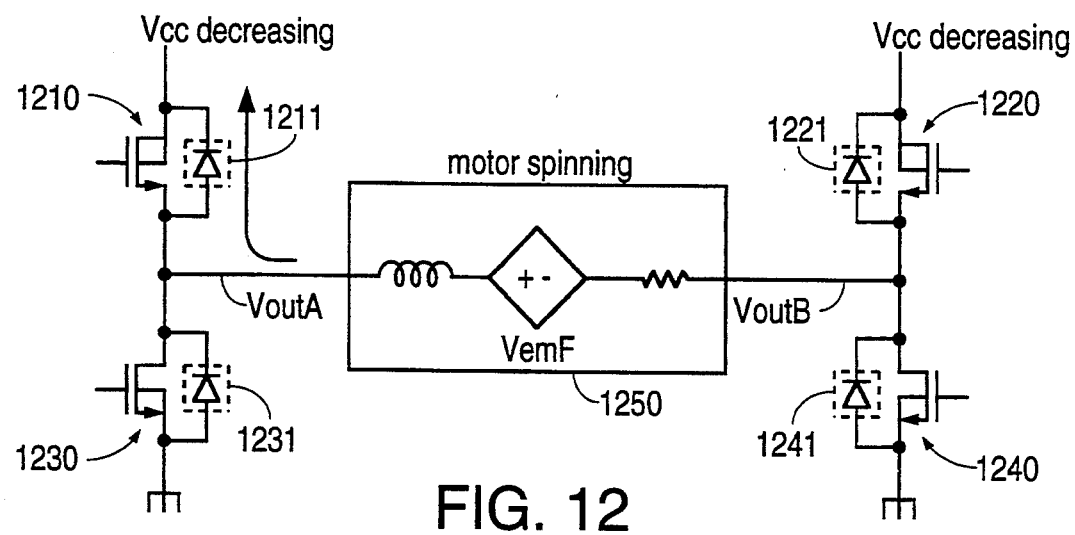
FIG. 12 shows a simplified circuit diagram of a generalized prior art halfbridge.
Figure 14A:
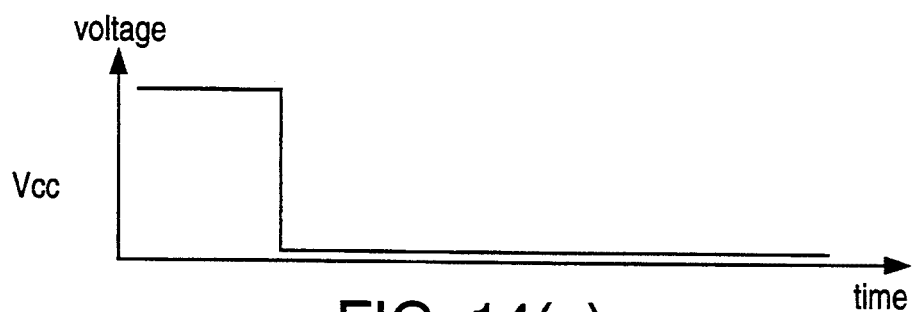
FIGS. 14(a), 14(b) and 14(c) show waveform diagrams indicating the decay of back emf in the prior art circuit of FIG. 12.
Figure 14B:
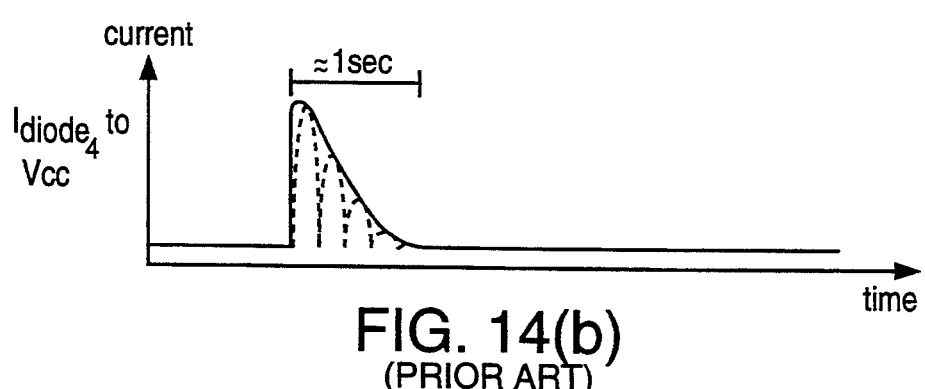
Figure 14C:
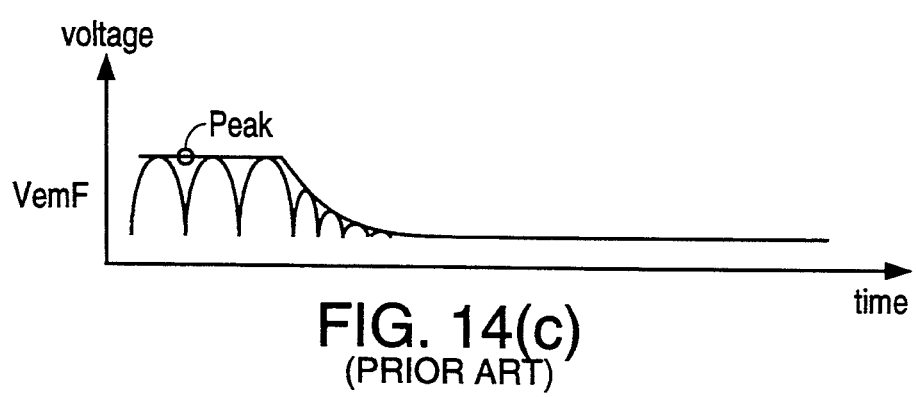
Figure 13A:
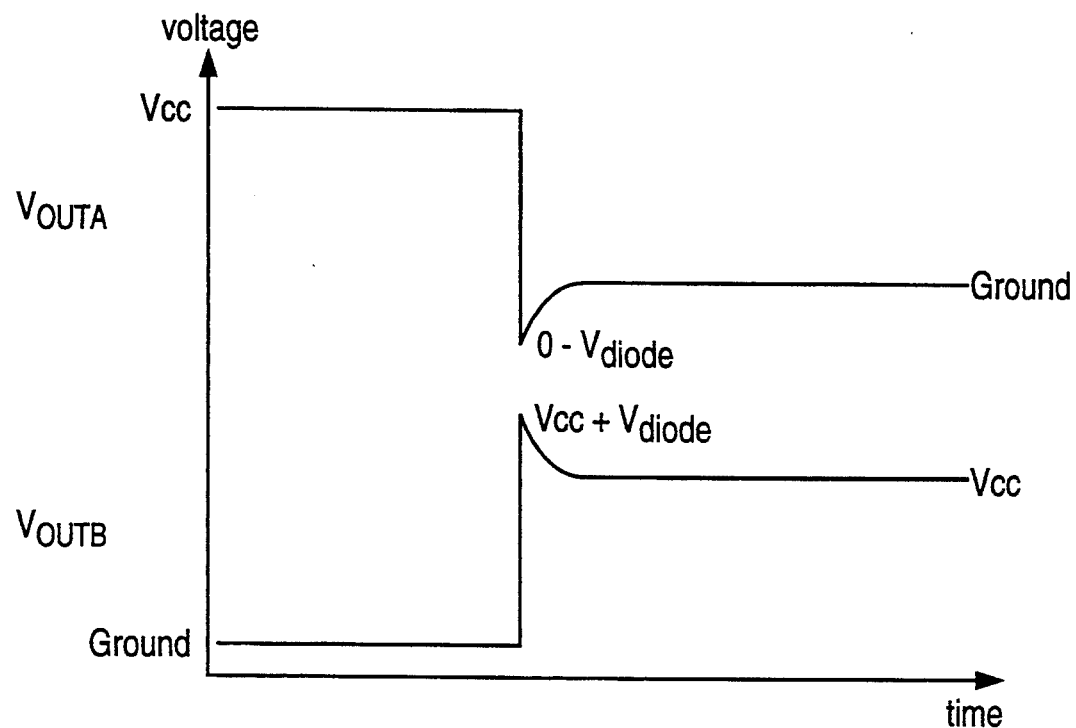
FIGS. 13(a) and 13(b) show waveform diagrams indicating flyback pulses generated by a motor.
Figure 13B:
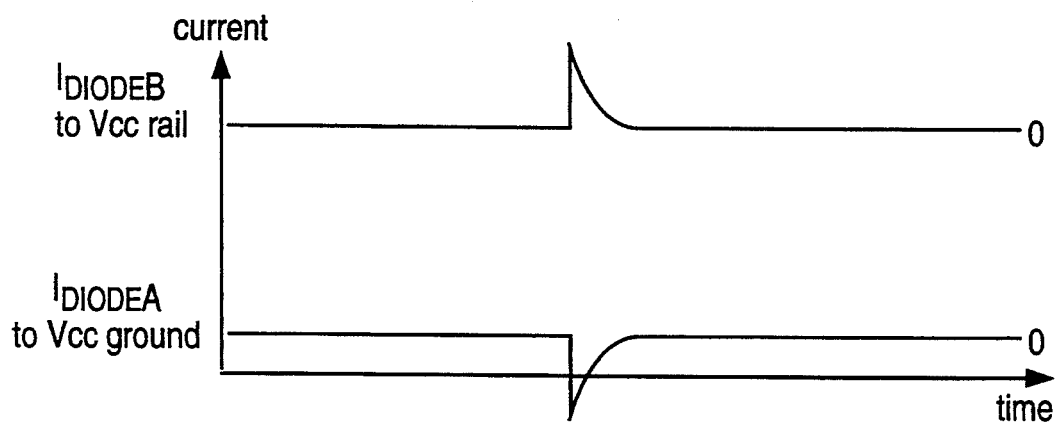
Figure 15:
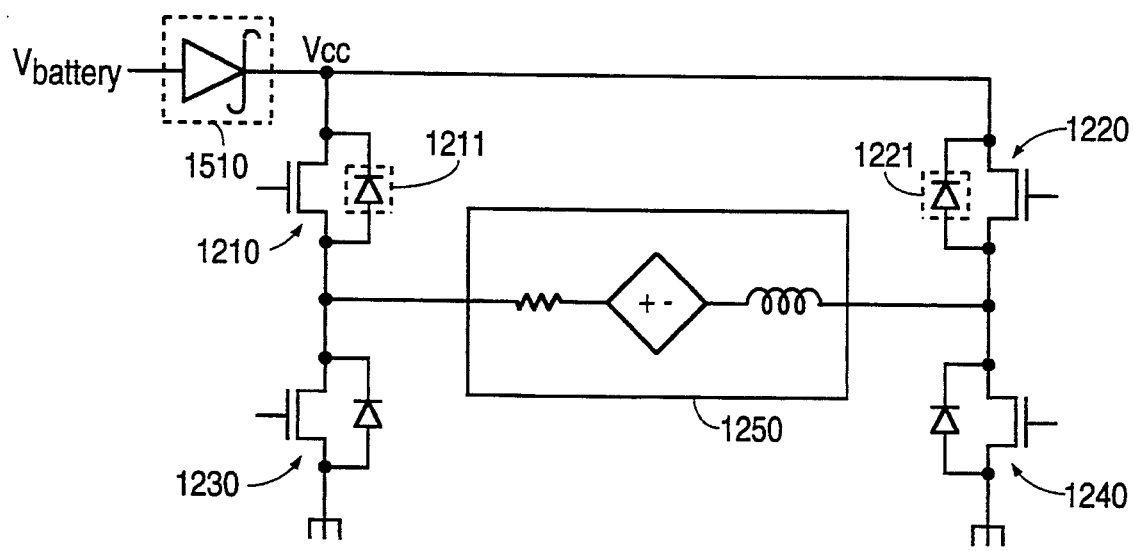
FIG. 15 shows a simplified circuit diagram indicating a prior art apparatus for isolating back emf.
Figure 16:
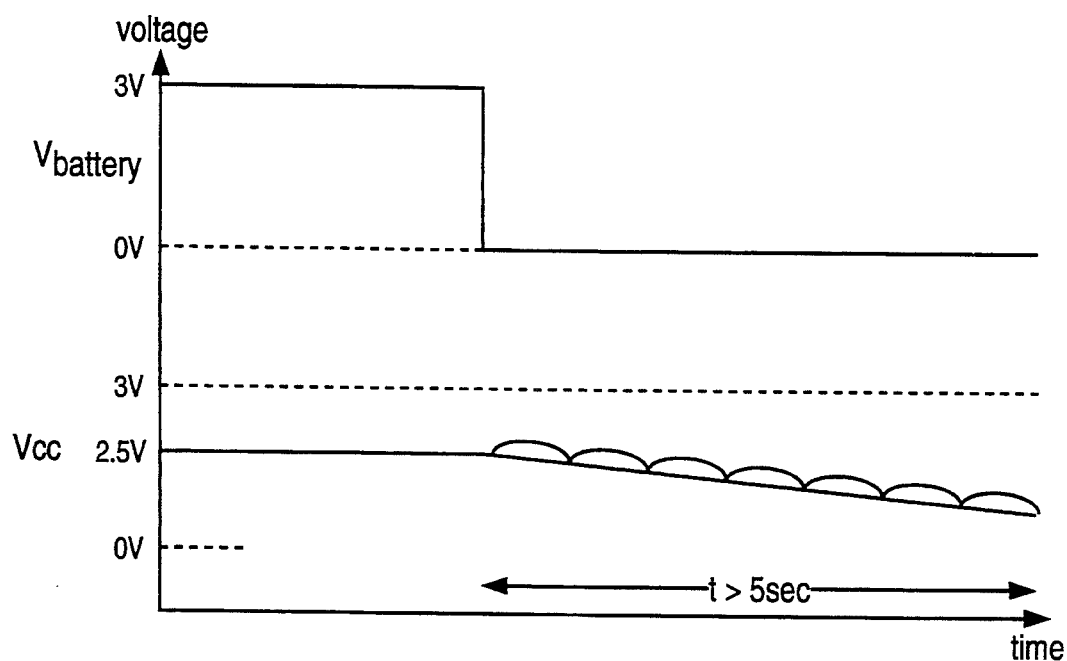
FIG. 16 shows a waveform diagram indicating the decay of back emf in the prior art circuit of FIG. 15.

FIGS. 8(*a*) and 8(*b*) show generalized N-phase output stages incorporating the teachings of the first and second embodiments. These figures are entered to indicate that the specific teachings of the first and second embodiments can be incorporated into multiple-phase arrangements. In particular, FIG. 8(a) shows a N-phase bridge incorporating the NMOS totem-pole structure of the first embodiment, and FIG. 8(b) shows an N-phase bridge incorporating the CMOS structure of the second embodiment.

Although the present invention has been described in considerable detail with reference to certain preferred embodiments thereof, other embodiments are possible. For example, the output stage of the present invention can be used to drive any inductive load which produces flyback emf when power is disconnected. Therefore, the spirit and scope of the appended claims should not be limited to the description of the preferred embodiments contained herein.

We claim:

1. A push-pull output stage for driving a motor comprising:
    a first MOSFET including a first drain connected to a power supply, a first source, and a body electrically isolated from said first source;
    a second MOSFET including a grounded second source and a second drain;
    said motor having a pole connected to the first source and the second drain; and
    a charge storing device connected to the first source and the second drain.

2. An output stage according to claim 1, wherein said first MOSFET is an n-channel MOSFET, said second MOSFET is an n-channel MOSFET, and said output stage further comprises:
    an asymmetric element connected between the charge storing device and the first source and the second drain, said asymmetrical element allowing charge to accumulate on said charge storing device, but preventing current flow from said charge storing device to said first source and said second drain.

3. An output stage according to claim 2, wherein said asymmetric element is a diode having an anode connected to said first source and said second drain, and a cathode connected to said charge storing device.

4. An output stage of claim 1 wherein said body is connected to ground.

5. An output stage of claim 1 wherein said body is maintained at a predetermined voltage level.

6. An output stage of claim 1 wherein said charge storing device is a grounded capacitor and said output stage further comprises a grounded zener diode connected in parallel with the capacitor.

7. An output stage of claim 1, wherein said first and second MOSFETs form a halfbridge and said motor has a plurality of windings, and wherein said output stage further comprises a plurality of identical halfbridges, each halfbridge being connected to one of said plurality of windings.

8. An output stage of claim 7, wherein said number of windings is three.

9. A push-pull output stage for driving a motor comprising:
    a first MOSFET including a first source connected to a power supply, a first body electrically isolated from said first source, and a first drain;
    a second MOSFET including a grounded second source, a grounded second body, and a second drain;
    said motor having a pole connected to the first drain and the second drain; and
    a charge storing device connected to the first body.

10. An output stage of claim 9, wherein said first MOSFET is a p-channel MOSFET and said second MOSFET is an n-channel MOSFET.

11. An output stage of claim 9 wherein said charge storing device is a grounded capacitor and said output stage further comprises a grounded zener diode connected in parallel with the capacitor.

12. An output stage of claim 9 wherein said first and second MOSFETs form a halfbridge and said motor comprising a plurality of windings, and wherein said output stage further comprises a plurality of identical halfbridges, each of said plurality of halfbridges being connected to one of said plurality of windings.

13. An output stage of claim 12, wherein said number of windings is three.

14. A method for recovering flyback energy from a motor which is connected to a push-pull output stage comprised of an n-channel highside MOSFET and an n-channel lowside MOSFET, wherein a first source of the highside MOSFET is electrically separated from a first body of the highside MOSFET, the method comprising the steps of:
    connecting a first drain of the highside MOSFET to a supply voltage;
    connecting said first body of the highside MOSFET to ground;
    connecting a second source of the lowside MOSFET to ground; and
    connecting a charge storing device to the first source of the highside MOSFET and a second drain of the lowside MOSFET.

15. A method of claim 14 further comprising the step of:
    connecting a diode between the charge storing device and the first source of the highside MOSFET and the second drain of the lowside MOSFET such that an anode of the diode is connected to the first source of the highside MOSFET and the second drain of the lowside MOSFET and a cathode of the diode is connected to the charge storing device.

16. A method of claim 14 further comprising the step of:
    connecting a grounded zener diode in parallel with the charge storing device such that voltage potentials greater than the capacity of the charge storing device are shunted to ground.

* * * * *

UNITED STATES PATENT AND TRADEMARK OFFICE
CERTIFICATE OF CORRECTION

PATENT NO.    :   5,377,094
DATED         :   December 27, 1994
INVENTOR(S)   :   Richard K. Williams et al.

It is certified that error appears in the above-identified patent and that said Letters Patent is hereby corrected as shown below:

On title page, item [73],
Assignee should read:  Siliconix incorporated.

Col. 6, line 16 after "diagrams" insert --indicating the operation of the apparatus according to the first embodiment--.

Signed and Sealed this

Nineteenth Day of September, 1995

Attest:

BRUCE LEHMAN

*Attesting Officer*        *Commissioner of Patents and Trademarks*